(12) United States Patent
Andersen et al.

(10) Patent No.: US 6,590,013 B1
(45) Date of Patent: Jul. 8, 2003

(54) HARDENER FOR USE IN-UREA-FORMALDEHYDE AND UREA-MELAMINE-FORMALDEHYDE BASED ADHESIVES, AN ADHESIVE COMPOSITION COMPRISING SAID HARDENER AND ITS USE

(75) Inventors: Bjørn Andersen, Vordingborg (DK); Bo Gao Brehmer, Hvidovre (DK)

(73) Assignee: A/S F. Heimann & Co., Kvistgard (DK)

( * ) Notice: Subject to any disclaimer, the term of this patent is extended or adjusted under 35 U.S.C. 154(b) by 0 days.

(21) Appl. No.: 09/744,376

(22) PCT Filed: Mar. 24, 1999

(86) PCT No.: PCT/DK99/00159

§ 371 (c)(1),
(2), (4) Date: Jul. 11, 2001

(87) PCT Pub. No.: WO99/48991

PCT Pub. Date: Sep. 30, 1999

(30) Foreign Application Priority Data

Mar. 25, 1998 (DK) .......................................... 1998 00419

(51) Int. Cl.⁷ ................................................. C08L 1/00
(52) U.S. Cl. ............................. 524/13; 524/47; 524/52; 524/53; 524/202; 524/203; 524/307; 524/316; 524/405; 524/416; 524/423; 524/434; 524/437; 524/444; 524/445; 524/446; 524/451; 524/512
(58) Field of Search ................................ 524/291, 405, 524/416, 512, 52, 53, 13, 47, 202, 203, 307, 316, 434, 437, 444, 445, 446, 451, 423

(56) References Cited

U.S. PATENT DOCUMENTS

| | | | | |
|---|---|---|---|---|
| 2,873,260 A | | 2/1959 | Corwin | ....................... 260/17.3 |
| 3,935,149 A | * | 1/1976 | Kraft et al. | ........... 260/29.6 TA |
| 4,350,788 A | * | 9/1982 | Shimokawa et al. | ........ 524/309 |
| 4,479,840 A | * | 10/1984 | Takegawa et al. | ........... 156/327 |
| 5,543,456 A | * | 8/1996 | Iriguchi et al. | .............. 524/542 |

FOREIGN PATENT DOCUMENTS

| | | |
|---|---|---|
| DE | 30 08 218 | 1/1981 |
| EP | 0 249 747 | 5/1987 |
| EP | 0 501 174 | 9/1992 |
| GB | 761777 | 11/1970 |
| GB | 1 510 781 | 5/1978 |
| GB | 2 095 683 | 10/1982 |
| GB | 2 245 578 | 1/1992 |
| GB | 2 274 084 | 7/1994 |
| WO | WO 86/00915 | 2/1986 |

* cited by examiner

Primary Examiner—Judy M. Reddick
(74) Attorney, Agent, or Firm—Birch, Stewart, Kolasch & Birch, LLP

(57) ABSTRACT

A hardener for use in urea-formaldehyde and urea-melamine-formaldehyde based adhesives comprises a polyvinyl acetate emulsion together with a metal chloride and an ammonium salt. The adhesive composition comprising a urea-formaldehyde or urea-melamine-formaldehyde resin, and the above hardener provides an increased curing rate, an acceptable viscosity, better adhesion and greater tolerance towards substrate type.

17 Claims, No Drawings

HARDENER FOR USE IN UREA-FORMALDEHYDE AND UREA-MELAMINE-FORMALDEHYDE BASED ADHESIVES, AN ADHESIVE COMPOSITION COMPRISING SAID HARDENER AND ITS USE

TECHNICAL FIELD

The present invention relates to a hardener for use in urea-formaldehyde and urea-melamine-formaldehyde based adhesives. The invention furthermore relates to an adhesive composition comprising a urea-formaldehyde or urea-melamine-formaldehyde resin and a hardener therefor, which adhesive composition provides faster curing rate, better adhesion and a wider application range than prior art adhesives. Further, the invention allows wide variations in the resin:hardener ratio without compromising the quality of the glue joint obtained.

The invention furthermore relates to the use of said hardener for curing urea-formaldehyde or urea-melamine-formaldehyde resins.

BACKGROUND ART

Urea-formaldehyde (UF) resins and urea-melamine-formaldehyde (UMF) resins are widely used in industry for gluing wood and as binders for the production of wood-based materials, including chipboard, plywood and various fibreboards, in the fortification of starch adhesives for the manufacture of paper bags and corrugated box boards, the production of insulating foams, high quality sandpaper and parquet flooring.

Urea and melamine adhesives are simple reaction products of urea and/or melamine with formaldehyde. They are set or cured by the use of a hardener, either by heat or at room temperature. Hardeners are either acidic substances themselves, or they are capable of liberating acid when mixed with the resin. Ammonium salts of strong acids are widely used hardeners.

U.S. Pat. No. 2,873,260 discloses a craze-resistant, acid-hardenable, gap-filling adhesive comprising a water-soluble urea-formaldehyde condensate, wherein the powdery hardener is selected among ammonium chloride and ammonium sulphate.

GB 761,777 discloses a dry composition comprising a dry, powdered urea- or thioureaaldehyde condensation product in the intermediate water-soluble, hardenable stage in admixture with dry, finely divided aluminum sulphate as a catalyst. Such powdery products are inconvenient to handle and create an unhealthy environment compared to liquid UF or UMF resins and liquid hardeners.

Further, it is known from GB 2,274,084 A to use, as the hardener an aqueous solution of ammonium chloride, alkaline urea, and hexamine. The resulting salt solution provides, however, a glue having a very poor filling capacity.

Further, GB 2,245,578 A discloses an aqueous batch for curing a formaldehyde-containing resin, containing ammonium, aluminium and sulphate ions, and urea. Such a curing system may provide an acceptable curing rate, but a very low viscosity adhesive is unavoidably obtained, resulting in a poor filling capacity.

EP 0249747 B1 discloses a curing agent composition for curing urea-formaldehyde or urea-melamine-formaldehyde adhesive resins comprising an ammonium salt of an inorganic or organic acid, wherein said composition further comprises an acid, urea, a glycol or a functional derivative thereof and, optionally, a metal salt. However, said curing agent composition comprises no polyvinyl acetate, resulting in a poor flexibility in the glue line.

WO 86/00915 discloses a method of adhering or cementing together two or more substrates by the use of a liquid composition comprising an organic polyhydroxy compound, an ammonium phosphate, water-dispersible polyvinyl acetate, water-dispersible formaldehyde resin, polyamido compound and water-hardenable setting agent. The composition, which comprises up to 5% of polyvinyl acetate, more preferably 2 to 5% thereof, does not include any metal chloride, resulting in an unsatisfactorily long curing time. Also the pH of said liquid composition is relatively high, which further reduces the curing rate. Finally, the liquid composition is produced by blending together all ingredients in the form of a dry powder, whereupon water is mixed with said powder to form a slurry (see the example). The use of a powder has, however, a number of drawbacks, as already pointed out above, such as dust problems, resulting in an unhealthy working environment, and necessitates an extra process step compared to the use of a liquid system.

As it appears from the above, a need still exists for an adhesive composition, which fulfils the requirements of a safe and rapid gluing of wood parts of different origin, such as softwood, e.g. coniferous tree, as well as hardwood, such as e.g. teak wood. Further, it would be desirable to have an adhesive composition which can be used for gluing wood of different qualities and of different moisture or oil content.

BRIEF DESCRIPTION OF THE INVENTION

It has now surprisingly been found that the use of a hardener comprising a polyvinyl acetate (PVA) emulsion together with a metal chloride and an ammonium salt of an organic or inorganic acid for curing a urea-formaldehyde or a urea-melamine-formaldehyde resin, results in an adhesive composition having a considerably increased curing rate, an acceptable viscosity, better adhesion and greater tolerance towards substrate type and presents fewer problems to the working environments than prior art adhesives. Further, the glue-line has a better water—resistance and better mechanical properties than prior art adhesives.

In a first aspect the present invention thus relates to a hardener for use in urea-formaldehyde or urea-melamine-formaldehyde based adhesives, comprising a metal chloride and an ammonium salt of an organic or inorganic acid, wherein the metal chloride is selected among aluminum, zinc and magnesium chloride, the ammonium salt is selected among mono- and di-ammonium phosphate, ammonium borate and ammonium citrate, wherein the weight ratio of metal chloride to ammonium salt is in the range of 3:1–0.5:1, and the hardener further comprises a polyvinyl acetate emulsion.

In a second aspect the present invention relates to an adhesive composition comprising a urea-formaldehyde or urea-melamine-formaldehyde resin and the above disclosed hardener.

Furthermore, the present invention relates to the use of the above disclosed hardener for curing urea-formaldehyde or urea-melamine-formaldehyde resins.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BEST MODE FOR CARRYING OUT THE INVENTION

The metal chloride used as one component of the hardener is selected among aluminum chloride, zinc chloride and magnesium chloride, preferably being aluminum chloride.

As a further component of the hardener an ammonium salt of an organic or inorganic acid is used, said salt being selected among mono- and di-ammonium phosphate, ammonium borate and ammonium citrate, preferably being mono-ammonium phosphate.

Thus, it has been found that the metal chlorides disclosed above, when used as an acid-liberating curing agent, will decrease the pH of the hardener more efficiently than the conventionally used ammonium salts, provided an ammonium salt is used concomitantly. Further, a higher stability of the hardener is obtained compared to ammonium chloride containing hardeners, the latter tending to be destabilised when mixed with a polyvinyl acetate emulsion.

The polyvinyl acetate (PVA) emulsion used in the hardener comprises polyvinyl acetates having a molecular weight in the range of 2,000 to 20,000, a viscosity in the range of 5,000 to 40,000 cps (mPa·s), preferably about 10,000 to 25,000 at 23° C., and a solids content of 45 to 65% by weight. The PVA is preferably an acid-modified PVA, such as a PVA modified by e.g. acetyl or propionyl groups.

By the use of polyvinyl acetate it is possible to decrease the pH of the hardener to 1 or even lower without breaking the uniform phase of polymers. This results in a considerably increased curing rate. Furthermore, the PVA component provides an increased tack and an increased impact strength compared to a conventional urea-formaldehyde or urea-melamine-formaldehyde adhesive. Without being bound to any theory, it is thought that methylol groups present in the urea-formaldehyde or urea-melamine-formaldehyde may react with hydroxyl groups in the polyvinyl acetate leading to improved water-resistance of the glue line obtained.

In a preferred embodiment of the invention the relative proportions of the hardener components are:

a) 5 to 80% by weight of polyvinyl acetate emulsion,
b) 1 to 25% by weight of a metal chloride,
c) 1 to 25% by weight of an ammonium salt,
d) 0 to 3% by weight of conventional additives and
e) 0 to 20% by weight of fillers and/or extenders,
f) the balance water.

It is important to control the weight ratio of metal chloride and the ammonium salt to the range 3:1 to 0.5:1, preferably to 1.5:1–1:1 in order to balance the H$^+$concentration in the hardener and adhesive.

In a particularly preferred embodiment of the present invention the hardener comprises a) 30 to 65% by weight of polyvinyl acetate emulsion,
b) 4 to 10% by weight of a metal chloride, especially about 4.5 to 6%,
c) 4 to 10% by weight of an ammonium salt, especially about 4.5 to 6%,
d) 0.4 to 2% by weight of conventional additives,
e) 2 to 20 by weight of fillers and/or extenders,
f) the balance water.

There are no particular limitations on which urea-formaldehyde or urea-melamine-formaldehyde resins can be used together with the hardener according to the invention.

Preferably, however, the UF and UMF resins have a solids content of about 40 to 75%, preferably about 60 to 70%, a viscosity of about 1500 cps (mPa·s) to 6000 cps (mPa·s), preferably about 1500 cps (mPa·s) to 4500 cps (mPa·s) at 23° C., and a free formaldehyde content of below 1%. Such products are obtainable by the well-known reactions of addition of formaldehyde to the respective amino compound followed by a condensation reaction to form the polymer. Alternatively, such products are commercially available from e.g. Dyno Industries A/S, Norway under the trade names Dynorit® L-103 and Dynorit® L-108.

In the adhesive composition according to the invention the resin:hardener-ratio preferably is in the range 10:1 to 3:1, preferably about 5:1. If said ratio is higher than about 10:1, curing will proceed too slowly, and the gelling time is more than 6 minutes at 60° C. On the other hand, a ratio of less than about 3:1 results in a gelling time of less than about 2 minutes at 60° C., which is inconveniently short. However, it is an advantage of the present adhesive compositions that within the above quoted ratio of resin and hardener, said ratio can be adapted in the individual case to provide the optimum result for any specific substrate to be glued depending on e.g. type of wood (soft- or hardwood), quality of wood and moisture or oil content thereof.

By means of the present invention a highly improved flexibility is thereby obtained, the adhesive composition according to the invention providing a wider application range and greater tolerance towards substrate type than prior art adhesives. Thus, the adhesive composition according to the invention may be used also for gluing teak wood, which has hitherto necessitated a special hardener, as teak wood has a high natural oil content.

Further, the adhesive composition according to the invention may be used to glue wood having a relatively high water content of up to about 15%, whereas conventionally used adhesives cannot be used for wood having a water content of above about 10%. Also the adhesive composition according to the invention can be applied to glue wood parts having a different water content, whereas prior art UF and UMF adhesives require wood having the same water content in the parts to be glued together.

Finally, the adhesive composition according to the invention provides a much better wetting property.

Also the hardener according to the invention is much easier to apply, its tolerance in terms of amount being added being greatly improved. Thus, whereas prior art UF or UMF adhesives require an exact amount of hardener to be added, the hardener according to the invention may be used with good results in amounts differing up to about ±50% from the recommended value.

The hardener according to the invention may contain further conventionally used additives or auxiliaries, such as antifoaming agents, antifreeze agents, surfactants, formaldehyde-capturing agents and tackifiers.

A suitable antifoaming agent is Silicon Antischaumemulsion SRE, available from Wacker Chemie, Germany, and polypropylene glycol 400. Useful surfactants include polypropylene glycol 400 and Surfynol 420 from Air Products and Chemicals, Inc., whereas suitable antifreeze agents are e.g. lower alcohols, such as methanol, ethanol and monopropylene glycol.

The hardener may further comprise a formaldehyde-capturing agent in order to keep the content of free formaldehyde as low as possible. A suitable agent for capturing formaldehyde is urea.

Finally, a tackifier may be added, such as Dermulsene 511 and Dermulsene G from Drt., France.

Furthermore, the hardener according to the invention may contain fillers and/or extenders in an amount of up to about 20% by weight of the hardener. Fillers or extenders are usually added in order to reduce crazing, to increase viscosity or to reduce cost. Useful extenders are farinaceous substances such as cereal or root flours, e.g. rye, maize, potato or wheat flour. Other organic extenders include wood flour, coconut and walnut and pecan shell flours.

Among mineral fillers or extenders may be mentioned china clay, talc, and metal, alkali metal or alkaline earth metal silicates, oxides and sulfates, such as $BaSO_4$ and $CaSO_4$.

The hardener according to the invention is prepared by dissolving the metal chloride together with the ammonium salt in water, whereupon the polyvinyl acetate emulsion and additives, fillers or extenders, if any, are admixed. Mixing is continued, until a uniform mixture is obtained.

The hardener according to the invention is used for urea-formaldehyde or urea-melamine-formaldehyde based adhesives by simple addition of the hardener to the resin in question and mixing therewith.

The invention is disclosed in greater detail with reference to the below Preparations and Examples.

Preparations

Resin part:

Preparation 1

93.5 g of liquid urea-formaldehyde (68.5% solids content, obtainable from Dyno Industries, Norway) was mixed with 6.25 g of water. Subsequently, 0.25 g of antifoaming agent Silicon-Antischaumemulsion SRE, available from Wacker Chemie GmbH, Germany (SRE:water=1:4) was added. This sample was stirred vigorously until a uniform liquid was obtained.

The UF resin obtained has a viscosity of 1500 to 2500 cps (mPa·s) at 23° C., a solids content of about 64%, and a storage life of at least 4 months at 23° C.

Preparation 2

5.9 g of melamine-formaldehyde powder (obtainable from Dyno Industries A/S, Norway) was mixed with 7.9 g of water. Subsequently, 85.96 g of liquid urea-formaldehyde and 0.25 g of antifoaming agent SRE (SRE: water=1:4) was added. This sample was stirred vigorously until a uniform liquid was obtained.

The UMF resin obtained has a viscosity of 1500 to 2000 cps (mPa·s), a solids content of about 65%, and a storage life of at least 4 months at 23° C.

Preparation 3

25.56 g of melamine-formaldehyde powder was mixed with 13.38 g of water. Subsequently, 60.81 g of liquid urea-formaldehyde and 0.25 g of SRE (SRE:water=1:4) were added. This sample was stirred vigorously until a uniform liquid was obtained.

The UMF resin obtained has a viscosity of 2000 to 3000 cps (mPa·s), a solids content of about 67%, and a storage life of at least 2 months at 23° C.

Hardener part:

EXAMPLE 1

5.4 g of $AlCl_3$ and 4.4 g of $NH_4H_2PO_4$ were dissolved in 25 g of water. 63 g of polyvinyl acetate emulsion DPN15 from Wacker Chemie GmbH, Germany was added. Subsequently, the sample was stirred together with 1.5 g of polypropylene glycol 400 and 0.5 g of antifoaming agent SRE (1:4).

EXAMPLE 2

5 g of $AlCl_3$, 1 g of citric acid and 4.5 g of $NH_4H_2PO_4$ were dissolved in 16 g of water. Subsequently, 15 g of urea was added. After the urea was totally dissolved, 58 g of polyvinyl acetate emulsion DPN15 was combined therewith, and 0.5 g of antifoaming agent SRE (1:4) was added.

EXAMPLE 3

4.48 g of $AlCl_3$, 1.12 g of $Al_2(SO_4)_3$ and 4.4 g of $NH_4H_2PO_4$ were mixed with 28 g of water. After complete dissolution, 60 g of polyvinyl acetate emulsion DPN15 was added. Subsequently, 1.5 g of polypropylene glycol 400 and 0.5 g of SRE (1:4) were added.

EXAMPLE 4

An adhesive was obtained by mixing 100 parts by weight of resin according to preparation 1 with 20 parts by weight of hardener according to example 1. The gelling time of this adhesive was 3.1 minutes at 60° C.

EXAMPLE 5

An adhesive was obtained by mixing 100 parts by weight of resin according to preparation 2 with 30 parts by weight of hardener according to example 2. The gelling time of this adhesive was 2.7 minutes at 60° C.

EXAMPLE 6

An adhesive was obtained by mixing 100 parts by weight of resin according to preparation 3 with 15 parts by weight of hardener according to Example 3. The gelling time of this adhesive was 4.5 minutes at 60° C.

EXAMPLE 7

An adhesive was obtained by mixing 100 parts by weight of resin according to preparation 3 with 20 parts of weight of hardener according to example 1.

Said adhesive was tested according to Standard EN-205 D4 for the approval of adhesives for non-constructive purposes at Norsk Treteknisk Institutt, Norway. According to said test procedure, the following test results were obtained.

| Shear Strength | | | |
| --- | --- | --- | --- |
| Cycle 1 | | Cycle 3 | |
| Requirement ($N/mm^2$) | Ex. 7 ($N/mm^2$) | Requirement ($N/mm^2$) | Ex. 7 ($N/mm^2$) |
| 10.0 | 12.6 | 4.0 | 9.3 |

Further, the above adhesive was tested according to standard B.S. 1204-CC-BR for the approval of warm-setting glues. The following test results were obtained:

| Shear Strength | | | |
| --- | --- | --- | --- |
| Cooking for three hours | | Cold water for 20 hrs. | |
| Requirement | Ex. 7 | Requirement | Ex. 7 |
| 1113 N | 2314 N | 2225 N | 2927 N |

As it appears, the adhesive according to Example 7 passes both tests.

COMPARISON EXAMPLE 1

A hardener according to GB 2,245,578A was made by first mixing 13.3 g of aluminum sulphate with 36.7 g of water. After the aluminum sulphate was dissolved, 36.7 g of urea and 13.3 g of ammonium chloride were added, respectively. This hardener has a storage life of 6 weeks at 20° C.

By mixing 100 parts by weight of resin according to preparation 2 with 20 parts by weight of hardener according to example 1 and comparison example 1, respectively, the following results were obtained:

| Hardener | Viscosity of adhesive | Gelling time (at 60° C.) | Curing agent content |
|---|---|---|---|
| example 1 | 3900 cps | 3 minutes | 10% |
| comparison example 1 | 950 cps | 3.5 minutes | >26.6% |

The hardener according to comparison example 1 gives a reasonable gelling time, but the viscosity of the resulting adhesive is low. The adhesive will have a poor filling capacity compared with the inventive adhesive.

COMPARISON EXAMPLE 2

An adhesive composition obtained by mixing 100 parts of the resin according to preparation 1 with 10 parts of the hardener according to example 1 was applied in a conventional veneer board manufacturing process.

Bonding of a veneer board could be obtained in 35 to 40 seconds by pressing at a temperature of only 100 to 110° C.

This can be compared with the use of a hardener as disclosed in GB 2,274,081A, i.e. a hardener comprising ammonium chloride, alkaline urea, and hexamine in aqueous solution, having a solids content of 20%.

According to GB 2,274,081A, the use of such hardener in a composition comprising 100 parts of resin and 10 parts of hardener required pressing for 35 to 40 seconds at a temperature in the range of 140° C. to 160° C. for bonding a veneer board in a conventional process.

By using the hardener according to the invention, where the pressure treatment can be carried out at only 100 to 110° C., a more energy efficient bonding may thus be obtained.

COMPARISON EXAMPLE 3

A hardener according to EP 0 501 174 (example 2) was made by mixing 5 g of NH₄CL with 8 g of water, and 1.3 g of AlCl₃ solution was added. Thereafter 7 g of urea and 7.7 g of kaolin were added, followed by the addition of 63.7 g of emulsion of polyvinyl acetate and 7 g of kaolin. Finally 0.3 g Nopco was added.

20 parts of this hardener was mixed with 100 parts of resin preparation 2. The adhesive composition obtained was compared to the adhesive composition according to the invention resulting from mixing 100 parts of resin preparation 2 with 20 parts by weight of hardener according to example 1 of the present application.

The following results were obtained:

| Hardener | Viscosity of adhesive | Gelling time (at 60° C.) | pH of adhesive | Curing agent content |
|---|---|---|---|---|
| example 1 according to the invention | 3900 cps | 3 mins | 4.0 | 10% |
| comparative hardener according to EP 0 501 174 A1 | 3600 cps | 6 mins | 5.0 | 6.3% |

The above description of the invention reveals that it is obvious that it can be varied in many ways. Such variations are not to be considered a deviation from the scope of the invention, and all such modifications which are obvious to persons skilled in the art are also to be considered comprised by the scope of the succeeding claims.

What is claimed is:

1. A hardener for use in urea-formaldehyde or urea-melamine-formaldehyde based adhesives comprising a metal chloride and an ammonium salt of an organic or inorganic acid, wherein the metal chloride is at least one selected from the group consisting of aluminum, zinc and magnesium chloride, the ammonium salt is at least one selected from the group consisting of mono- and di-ammonium phosphate, ammonium borate and ammonium citrate, wherein the weight ratio of metal chloride to ammonium salt is in the range of 3:1–0.5:1, and wherein the hardener further comprises a polyvinyl acetate emulsion.

2. The hardener as claimed in claim 1, wherein the metal chloride is aluminum chloride.

3. The hardener as claimed in claim 1, wherein the ammonium salt is mono-ammonium phosphate.

4. The hardener as claimed in claim 1, wherein the polyvinyl acetate emulsion has a solids content of 45% to 65% by weight, wherein the weight % values are based on the total weight of the emulsion.

5. The hardener as claimed in claim 1, comprising:
   a) 5 to 80% by weight of polyvinyl acetate emulsion,
   b) 1 to 25% by weight of a metal chloride,
   c) 1 to 25% by weight of an ammonium salt,
   d) 0 to 3% by weight of conventional additives,
   e) 0 to 20% by weight of fillers and/or extenders, and
   f) the balance water, wherein the weight % values are based on the tonal weight of the hardener.

6. The hardener as claimed in claim 1, comprising:
   a) 30 to 65% by weight of polyvinyl acetate emulsion,
   b) 4 to 10% by weight of a metal chloride,
   c) 4 to 10% by weight of an ammonium salt,
   d) 0.4 to 2% by weight of conventional additives,
   e) 2 to 20% by weight of extenders and/or fillers and
   f) the balance water, wherein the weight % values are based on the total weight of the hardener.

7. The hardener as claimed in claim 5, wherein the additives are at least one selected from the group consisting of antifoaming agents, anti-freeze agents, surfactants, formaldehyde-capturing agents and tackifiers.

8. The hardener as claimed in claim 7, wherein the fillers or extenders are at least one selected from the group consisting of farinaceous substances, wood flour, mineral fillers and mineral extenders.

9. An adhesive composition comprising a urea-formaldehyde or urea-melamine-formaldehyde resin and the hardener as claimed in claim 1.

10. The adhesive composition as claimed in claim 9, wherein the urea-formaldehyde or urea-melamine-formaldehyde resin has a solids content of about 40 to 75 wt.

% and a free formaldehyde content of below 1 wt. %, wherein the weight percent values are based on the total weight of the adhesive composition.

11. The adhesive composition as claimed in claim 9 wherein the resin:hardener ratio is in the range of 10:1 to 3:1.

12. A method of curing urea-formaldehyde or urea-melamine-formaldehyde resins comprising a step of combining the urea-formaldehyde or urea-melamine-formaldehyde resin with the hardener of claim 1.

13. The hardener as claimed in claim 4, wherein the polyvinyl acetate emulsion has a solids content of 50 wt. % to 60 wt. %, wherein the wt. % is based on the total weight of the emulsion.

14. The hardener as claimed in claim 6, wherein the ammonium salt is present in a concentration of about 4.5 wt. % to 6 wt. %, wherein the wt. % values are based on the total weight of the hardener.

15. The hardener as claimed in claim 6, wherein the metal chloride is present in a concentration of about 4.5 wt. % to 6 wt. %, wherein the wt. % values are based on the total weight of the hardener.

16. The adhesive composition as claimed in claim 10, wherein the urea-formaldehyde or urea-melamine-formaldehyde resin has a solids content of about 60 to 70 wt. %, wherein the wt. % values are based on the total weight of the adhesive composition.

17. The adhesive composition as claimed in claim 11, wherein the resin:hardener ratio is in the range of about 5:1.

* * * * *